United States Patent
Nenov

(10) Patent No.: US 9,967,280 B1
(45) Date of Patent: *May 8, 2018

(54) SECURITY APPLIANCE

(71) Applicant: Fortress Information Security, LLC, Orlando, FL (US)

(72) Inventor: Dejan Nenov, Boise, ID (US)

(73) Assignee: Fortress Cyber Security, LLC, Orlando, FL (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/601,345

(22) Filed: May 22, 2017

Related U.S. Application Data

(63) Continuation of application No. 15/333,889, filed on Oct. 25, 2016, now Pat. No. 9,692,784.

(51) Int. Cl.
*H04L 29/06* (2006.01)

(52) U.S. Cl.
CPC ...... *H04L 63/1458* (2013.01); *H04L 63/0245* (2013.01); *H04L 63/1416* (2013.01); *H04L 63/20* (2013.01)

(58) Field of Classification Search
CPC .................................................. H04L 63/1458
See application file for complete search history.

(56) References Cited

U.S. PATENT DOCUMENTS

| | | | |
|---|---|---|---|
| 6,493,752 B1 | 12/2002 | Lee et al. | |
| 6,772,345 B1* | 8/2004 | Shetty | G06F 21/562 713/151 |
| 7,742,406 B1* | 6/2010 | Muppala | H04L 41/5022 370/230 |
| 7,778,194 B1* | 8/2010 | Yung | H04L 41/0896 370/235 |
| 8,355,338 B2* | 1/2013 | Wu | H04L 12/66 370/252 |
| 9,178,807 B1 | 11/2015 | Chua et al. | |
| 2003/0161272 A1* | 8/2003 | Teplitsky | H04L 45/7457 370/252 |
| 2004/0172529 A1 | 9/2004 | Culbert | |
| 2005/0091513 A1 | 4/2005 | Mitomo et al. | |
| 2005/0156733 A1 | 7/2005 | Choi et al. | |
| 2005/0283823 A1* | 12/2005 | Okajo | G06F 21/604 726/1 |
| 2006/0294579 A1* | 12/2006 | Khuti | H04L 63/02 726/3 |

(Continued)

OTHER PUBLICATIONS

U.S. Office Action on U.S. Appl. No. 15/333,889, dated Jan. 11, 2017.

*Primary Examiner* — Ali Shayanfar
(74) *Attorney, Agent, or Firm* — Foley & Lardner LLP

(57) ABSTRACT

A security appliance may incorporate a touch screen or similar input/output interface, providing command and control over network functionality and configuration, without requiring log in via a network from another computing device. During denial of service attacks, commands from the local interface may be given priority access to processing resources and memory, allowing mitigating actions to be taken, such as shutting down ports, blacklisting packet sources, or modifying filter rules. This may allow the security device to address attacks without having to be manually rebooted or disconnected from the network.

18 Claims, 11 Drawing Sheets

(56) References Cited

U.S. PATENT DOCUMENTS

| | | | |
|---|---|---|---|
| 2007/0260722 A1* | 11/2007 | Lee | H04L 43/028 709/223 |
| 2008/0316922 A1* | 12/2008 | Riddle | H04L 41/0893 370/230 |
| 2010/0077471 A1 | 3/2010 | Schleiss et al. | |
| 2010/0132027 A1* | 5/2010 | Ou | H04L 63/0227 726/11 |
| 2010/0177660 A1* | 7/2010 | Essinger | H04W 4/001 370/254 |
| 2011/0125749 A1* | 5/2011 | Wood | H04L 43/026 707/737 |
| 2011/0209203 A1 | 8/2011 | Shafer | |
| 2011/0242979 A1* | 10/2011 | Feroz | H04L 47/17 370/235 |
| 2011/0252474 A1* | 10/2011 | Ward | G06F 21/56 726/23 |
| 2012/0084438 A1 | 4/2012 | Raleigh et al. | |
| 2013/0117837 A1* | 5/2013 | Kapadia | H04L 63/0263 726/14 |
| 2014/0253483 A1 | 9/2014 | Kupersztoch et al. | |
| 2017/0091736 A1* | 3/2017 | Sleeman | G06Q 20/18 |

* cited by examiner

Rules Database 107

| Rule Identifier 120 | Rule 122 | Mandatory Flag 124 | Distribution Percentage 126 | Device Identifiers 128 |
|---|---|---|---|---|
| 1 | Block DNS requests to 1.2.3.4 | Yes | 100% | 1, 2, 3, 4, 5... |
| 2 | Block DNS requests with size > 500B | No | 80% | 1, 3, 4, 5, 6, 8, 9... |
| 3 | Block transmissions to WAN from clients at 10.0.2.* | No | 10% | 2, 12, 22... |
| ○○○ | | | | |
| n | [action(s)]+ [condition(s)]+ [parameters(s)] | [Flag] | [Percentage] | [IDs] |

*FIG. 1E*

SECURITY APPLIANCE

RELATED APPLICATIONS

The present application claims the benefit of and priority as a continuation to U.S. Nonprovisional patent application Ser. No. 15/333,889, entitled "Security Appliance," filed on Oct. 25, 2016, the entirety of which is hereby incorporated by reference.

BACKGROUND

Many network security devices or appliances are configured to be managed via a network. For example, in many implementations, a user or administrator may connect, from another computing device on the local network or on an external network, to a predetermined address of a server hosted by the network security device, such as a web server. The user or administrator may then view logs, change configuration settings, or perform other maintenance tasks. However, many types of network attacks may prevent successful connection to or administration of the appliance, such as denial of service attacks that consume all of the available bandwidth. In many such instances, a user or administrator may have to manually reboot the appliance and/or disconnect it from an external network. Furthermore, upon reattachment to the external network, the attack may continue.

SUMMARY

A security appliance may instead incorporate a touch screen or similar input/output interface, providing command and control over network functionality and configuration, without requiring log in via a network from another computing device. During denial of service attacks, commands from the local interface may be given priority access to processing resources and memory, allowing mitigating actions to be taken, such as shutting down ports, blacklisting packet sources, or modifying filter rules. This may allow the security device to address attacks without having to be manually rebooted or disconnected from the network.

BRIEF DESCRIPTION OF THE FIGURES

FIG. 1E is an illustration of an example of a rules database, according to one implementation;

In the drawings, like reference numbers generally indicate identical, functionally similar, and/or structurally similar elements.

DETAILED DESCRIPTION

The following description in conjunction with the above-referenced drawings sets forth a variety of embodiments for exemplary purposes, which are in no way intended to limit the scope of the described methods or systems. Those having skill in the relevant art can modify the described methods and systems in various ways without departing from the broadest scope of the described methods and systems. Thus, the scope of the methods and systems described herein should not be limited by any of the exemplary embodiments and should be defined in accordance with the accompanying claims and their equivalents.

Network security frequently requires packet inspection and filtering, including applying blocking, forwarding, or redirection rules to incoming packets. For example, an administrator may wish to block packets having particular source internet protocol (IP) addresses or destination addresses, or packets associated with particular protocols, applications or ports; may wish to forward other packets to predetermined destinations based on these parameters regardless of a destination included in the packet; or may wish to modify packets based on these parameters.

In many implementations, rules on the device may be configured via a network, or other management or maintenance functions performed remotely. For example, in many implementations, a user or administrator may connect, from another computing device on the local network or on an external network, to a predetermined address of a server hosted by the network security device, such as a web server. The user or administrator may then view logs, change configuration settings, or perform other maintenance tasks. However, many types of network attacks may prevent successful connection to or administration of the appliance, such as denial of service attacks that consume all of the available bandwidth. In many such instances, a user or administrator may have to manually reboot the appliance and/or disconnect it from an external network. Furthermore, upon reattachment to the external network, the attack may continue.

Accordingly, a security appliance may instead incorporate a touch screen or similar input/output interface, providing command and control over network functionality and configuration, without requiring log in via a network from another computing device. During denial of service attacks, commands from the local interface may be given priority access to processing resources and memory, allowing mitigating actions to be taken, such as shutting down ports, blacklisting packet sources, or modifying filter rules. This may allow the security device to address attacks without having to be manually rebooted or disconnected from the network.

Figure 1A:
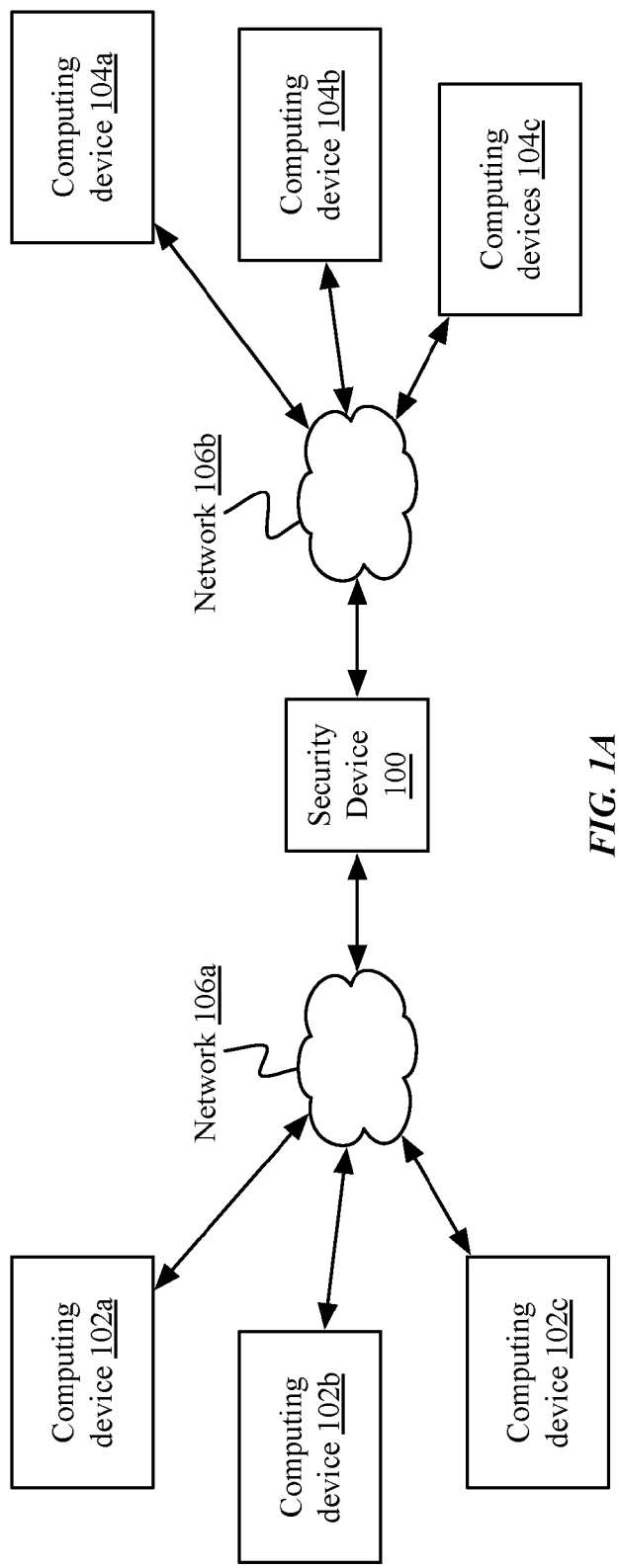
FIG. 1A is a block diagram of an embodiment of a computing environment for providing packet processing and network security.

Referring first to FIG. 1A, illustrated is a computing environment comprising a security device 100 deployed as an intermediary between a first one or more computing devices 102a-102c (referred to generally as client devices, clients, server devices, servers, host devices, hosts, or computing devices 102), and a second one or more computing devices 104a-104c (referred to generally as client devices, clients, server devices, servers, host devices, hosts, or computing devices 104), via a plurality of network segments 106a-106b (referred to generally as network segments or networks 106). Security device 100 may comprise a gateway, firewall, switch, hub, access point, modem, or any other such device. Although shown intermediary to networks 106a-106b, in some implementations, security device 100 may be deployed as a sidechain device. Networks 106 may comprise any type and form of network, including a local area network (LAN), wide area network (WAN) such as the Internet, a wireless network, a cellular network, a satellite network, a cable network, or any combination of these or other networks. Additional devices not illustrated may be deployed on networks 106, including switches, gateways, routers, firewalls, or other such devices. Computing devices 102, 104 may comprise any type and form of computing device, including desktop computers, laptop computers, tablet computers, smart phones, smart televisions, game consoles, wearable computers, networked devices or appliances such as Internet of Things (IoT) devices, server computers, workstations, or any other type and form of networked computing device, and may be variously referred to as servers, clients, hosts, remote devices, local devices, or by any other such name.

Security device 100 may receive packets from computing devices 102 and directed to other computing devices 104 (or vice versa), and may, depending on security and filtering rules, forward or retransmit the packet; block or discard the packet; or modify and retransmit the packet (e.g. with network address translation (NAT), payload stripping or encryption to prevent information exfiltration, etc.). Packet processing or security rules may be quite complex, based on a combination of information from one or more layers of the packet, including internet or network layer addresses, transport layer addresses, session or application layer protocols, payload information, other header information such as quality of service (QoS) requirements or priority, or any other type and form of information. For example, in some implementations, packet processing rules may be stored in a relational database and accessed via structured query language (SQL) requests, or other similar processing or query languages. For example, in one such implementation, a system may include a database with a rule (e.g. a blocking rule to discard or block further transmission of an incoming packet) associated with a range of source IP addresses (e.g. from a starting IP address ip_from to an ending IP address ip_to). Upon receipt of a packet, the system may determine if the source IP address of the packet (e.g. 1.2.3.4) is within the indicated range, such as via a query of the database:
SELECT * from ipranges WHERE INET_ATON('1.2.3.4') BETWEEN ip_from and ip_to; The SQL database may use a binary search tree, or B-tree index, to search through each of the ip_to and ip_from columns. However, as B-tree searches take O(log n) time on average (in Big O notation), this can take a significant amount of time. For example, given a potential search space in IPv4 of 4,294,967,296 potential addresses (from 0.0.0.0 to 255.255.255.255), a test system may take as much as 1.5 seconds to determine if the address is within a designated range. With IPv6 and a search space of 2^128 addresses, identifying if an address is within a given range may take even longer. Furthermore, as additional filter parameters are added for comparisons, the queries may grow exponentially more complex. For example, determining whether a packet matches a rule specifying a range of source addresses, a second range of destination addresses, a third range of protocol types, a fourth range of payload sizes, and a fifth range of priorities may cause significant latency in processing and forwarding the packet.

Figure 1B:
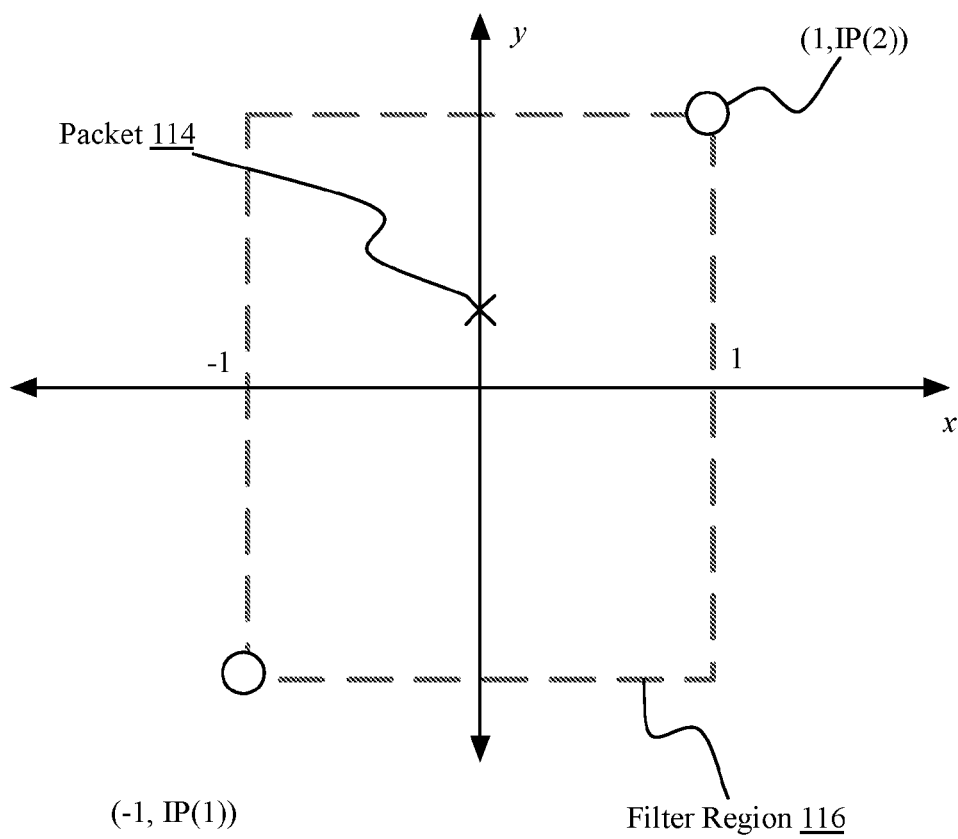
FIG. 1B is an illustration of an embodiment of mapping a packet to a filter region for geoprocessing-based packet processing and network security.

In some implementations, packet processing and security rules may be applied via geoprocessing-based analysis. Filter parameters, such as IP addresses or other such information, may be used to define one or more minimum bounding rectangles (MBR). For example, and referring briefly to FIG. 1B, illustrated is an embodiment of mapping a packet (e.g. packet 114) to a region (e.g. filter region 116) for geoprocessing-based packet processing and network security. The filter region may represent a range of parameters, such as source IP addresses from a first value IP(1) to a second value IP(2), such as ip_from and ip_to discussed above. A two-dimensional MBR may be defined with diagonally opposite corners based on the ip_from and ip_to values, e.g. from (−1, IP(1)) to (1, IP(2)) as shown. This makes it possible to search for an IP address in a spatial domain (e.g. a point at (0, source IP)), using geoprocessing based algorithms.

For example, parameters of an incoming packet may be compared to the MBR data using spatial algorithms, such as a coordinate search within an R-tree data structure. One example query may be:
SELECT * from ipranges WHERE MBRContains(mbr,ST_GeomFromText(CONCAT('Point (0',INET_NTOA('1.2.3.4'),')'))); Because a spatial domain query is used, the database server may use an R-tree index. Average search time for the space for an R-tree is $O(\log_M n)$, which may be significantly faster than the B-tree search discussed above. For example, in a similar test system to that discussed above, the above query executed in 0.05 seconds, a 30-fold reduction in time.

Thus, the identified MBRs within the tree may be used to apply corresponding filtering and/or forwarding rules to the packet. This may significantly accelerate rule searching and matching algorithms, reducing delays and computing resource requirements and accelerating network security processing.

Figure 1C:
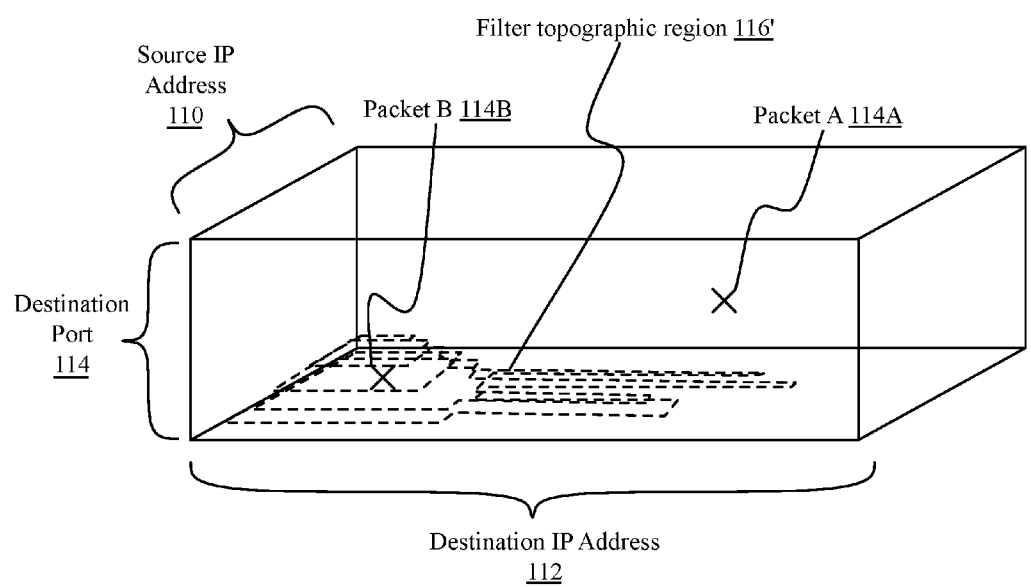
FIG. 1C is an illustration of an embodiment of a multi-dimensional topographic region for geoprocessing-based packet processing and network security.

Furthermore, multiple filter parameters may be searched and analyzed simultaneously. FIG. 1C is an illustration of an embodiment of a multidimensional topographic region 116' for geoprocessing-based packet processing and network security with boundaries based on source IP address 110, destination IP address 112, and destination port number 114. Three dimensional filter regions may be defined and spatial algorithms used to determine whether a packet falls within the region (e.g. packet B 114B) or outside of the region (e.g. packet A 114A). In some implementations, filter layers may be applied with different parameters, such as source IP addresses 110, destination IP addresses 112, source ports, destination ports 114, QoS requirements, protocol types, application layer protocol types, device identifiers, or any combination of these or other parameters. As shown, filter regions may be rectangles, such as MBRs, circles, or may be polygons or function-defined regions, shapes, or lines in various implementations.

As discussed above, packet processing or security rules may be quite complex, based on a combination of information from one or more layers of the packet, including internet or network layer addresses, transport layer addresses, session or application layer protocols, payload information, other header information such as quality of service (QoS) requirements or priority, or any other type and form of information. Administrators or security researchers may generate the rules based on identifications of known attack vectors, such as by directly observing attacks or attack attempts. For example, an administrator may observe a denial of service attack being transmitted from a subnet, and generate a rule to filter all or most of the packets from the subnet. Such attacks may be considered known or active threats, and the corresponding rules may be considered mandatory rules, or rules required to protect a network from known threats.

Additionally, administrators or security researchers may generate rules based on identifications of potential attack vectors, such as by identifying a vulnerability that has not yet been exploited in the wild, or by observing suspicious traffic that has not yet been associated with an attack. For example, an administrator may determine that a particular device is vulnerable to SSH attacks on non-standard ports, and may set up a rule to block SSH requests on ports other than 22 from being forwarded to the device, despite perhaps not having seen an attempted attack on the device in practice. In another example, an administrator may suspect that attack attempts may come from a particular country, and may decide to block all requests originating from that country. Such attacks may be considered potential or inactive threats, and the corresponding rules may be considered potential rules or rules that may be included to enhance security, without necessarily being required to protect against known threats. In many implementations, potential or inactive threats may have an estimated likelihood of becoming an active threat. For example, given a newly discovered vulnerability in a popular smartphone, it may be likely that malicious actors will attempt attacks as soon as the vulnerability is publicized or otherwise discovered. Such a threat may be presently inactive, but be considered to have a high likelihood of becoming active. Conversely, a suspicion that all packets from a particular country are attack attempts may be unlikely to be true, and may have a correspondingly low likelihood of becoming an active threat.

Accordingly, rules may be divided into a first set of rules to prevent known attack attempts, and a second set of rules to prevent potential attack attempts. This latter set of rules may be very large, and may include rules to protect against attacks that have not been and may not ever be implemented.

As rules databases get large, particularly for whitelist or blacklist-based blocking, it may take significant time to compare the packet information to each rule within the database, resulting in delays and inefficiencies within the system.

Figure 1D:
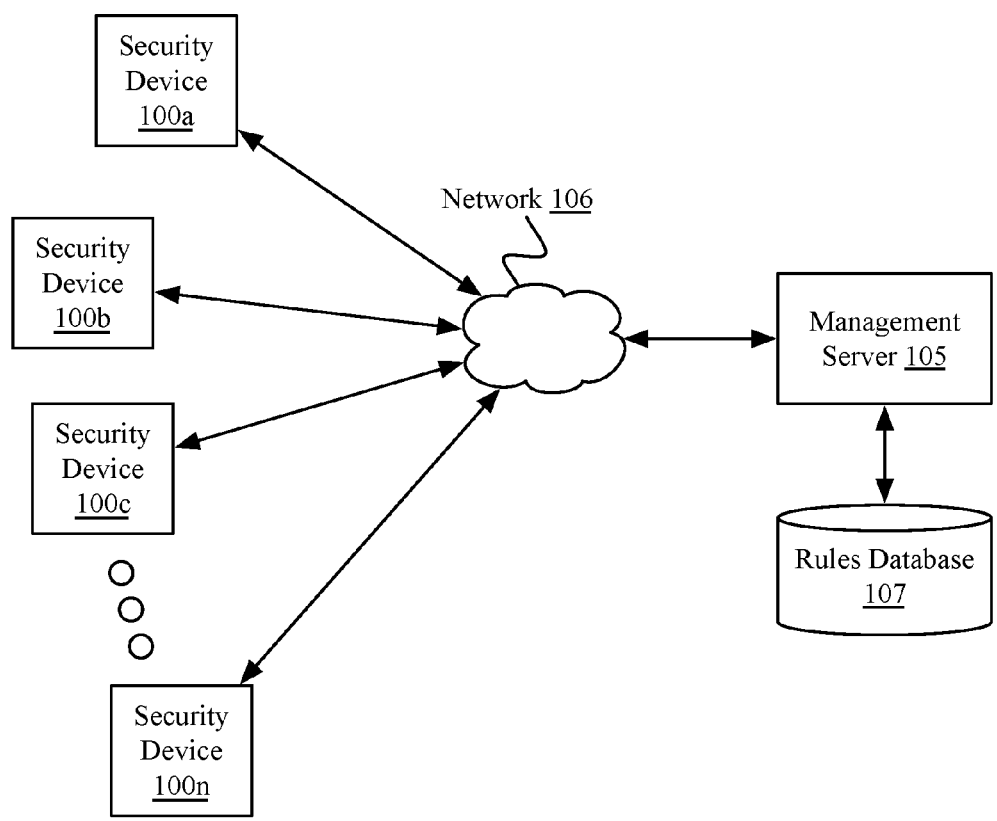
FIG. 1D is a block diagram of another embodiment of a computing environment for providing distributed rule sets to network appliances.

Instead, rules may be distributed to network security appliances according to a statistical model, in which the percentage of appliances receiving a particular rule is proportional to the likelihood of the corresponding attack (e.g. with rules corresponding to known or active attacks being distributed to 100% of appliances; and rules corresponding to inactive attacks being distributed to a lesser percentage of appliances). For example, and referring briefly to FIG. 1D, illustrated is a block diagram of an embodiment of a computing environment for providing distributed rule sets to network appliances. A management server 105 may comprise or maintain a rules database 105, comprising filtering, forwarding, modifying, or processing rules for various conditions and parameters. The management server may distribute the rules to a plurality of security devices 100*a*-100*n* via one or more network(s) 106. Each security device 100 may apply the rules to communications between one or more clients 102, 104 as discussed above. Rules corresponding to likely threats or active threats may be distributed to all or most of the security devices, while rules corresponding to unlikely or inactive threats may be distributed randomly to a smaller subset of the devices, with different rules distributed differently. Accordingly, the majority of appliances will be protected against all likely threats, and all of the rules will be active on at least some appliances, without requiring storing the entire rule database within memory of any security device. These devices may also serve as test machines for the rules; upon detecting an attack attempt corresponding to a non-mandatory rule, the device may notify the management server 105, which may increase the likelihood associated with the rule to 100%, ensuring that it is distributed to all appliances from that point on. Conversely, if no machine with an inactive attack rule detects a corresponding attack within a predetermined time, the likelihood may be reduced, freeing up memory for other, more important rules.

Thus, a rule set may be generated for each security device or appliance that includes (i) a first set of rules based on known attacks, identified as rules for mandatory inclusion in the rule set; and (ii) a subset of a second set of rules, identified as rules for potential inclusion in the rule set, selected randomly according to a distribution percentage, score, or weight for each potentially included rule. Higher scored rules, which may be more likely vectors for potential attack, may be distributed to a greater number of appliances; while lower scored rules that may be less likely or represent more speculative attacks may be distributed to fewer appliances.

Accordingly, the rule set for any security appliance may be limited in size compared to the entire rules database, while still providing protection against most attacks. This may allow reduced memory utilization on each security appliance, and reduced bandwidth consumption during distribution of the rules from a management server. Furthermore, by limiting the size of an active rule set on an appliance, the appliance may have reduced CPU usage and delay processing packets against the rule set in comparison to a complete rule set including both mandatory and potential rules. This may also improve battery life on portable appliances. Additionally, appliances deployed with rules for potential inclusion may provide early warnings of new attacks, such that the corresponding rule may quickly be added to the first, mandatory inclusion set for each security appliances.

FIG. 1E is an illustration of an embodiment of a rules database for distributed rule sets for network security appliances. Rules database 105 may be any type and form of database, including a flat file, array, relational database, or any other type of data format. In some implementations, rules database 105 may be a SQL database. As shown in FIG. 1D, in some implementations, rules database 105 may be stored on a storage device separate from a management server 105, such as a storage array, network attached storage device, database server, storage server, or any other type and form of storage device or as part of a computing device. In other implementations, rules database 105 may be stored in storage of management device 105, such as on a hard drive or drives, tape drive, flash drive, etc.

In some implementations, each rule within rules database 105 may be indexed or identified by a rule identifier 120, such as a string, hash value, random number, database or array index. This may allow for quick retrieval and modification of rules, as well as compact identification of rule sets provided to a security device. For example, a set of rule identifiers 120 may be associated with a device identifier for a security device, indicating the rule set distributed to said security device. In another example, upon detection of an attempted attack that matches a rule, a security device may store a rule identifier 120 to a log and/or transmit an identification of the rule identifier 120 to the management server 105 to indicate that an attempted attack has been detected and potentially stopped.

Each rule 122 may comprise one or more actions, one or more conditions, and one or more parameters. In many implementations, a rule may comprise a block or forward rule, indicating, respectively, whether to discard a matching packet or forward the packet to another device. The forwarding rule may indicate to forward the packet to a destination identified in the packet (e.g. in a destination IP address and destination port address respectively in a network and transport layer header of the packet), or may indicate to forward the packet to another device (e.g. a virtual machine for quarantine and/or testing; a processing machine for decryption or decompression; an alternate server for load balancing purposes, etc.). Rules may also include modification actions, such as removing a payload of a packet, replacing a payload with predetermined data or a null data set, modifying a header of the packet, etc. For example, in one implementation, a rule may indicate to modify a DNS query to remove additional data beyond a requested URL to prevent information exfiltration. Conditions may include any type and form of condition, and apply to any portion of a packet including headers or payloads at any layer of the OSI model. Multiple conditions may be applied simultaneously, with any appropriate Boolean operator (e.g. AND, OR, XOR, NOT, etc.). Rules may also include one or more parameters for conditions and/or actions, such as data to match, data to modify, data to replace with other data, etc.

In some implementations, a rule may be associated with a mandatory flag 124, indicating that the rule is a mandatory rule that must be included in every rule set distributed to security appliances. For example, in one implementation, an address of the management server may be included in a whitelist for each security appliance, so that the appliances may receive updated configurations and rule sets. The flag may be in any format, such as a predefined bit in a rule identifier 120, explicit flag, logical yes or no, or any other format. In other implementations, flags 124 may not be used.

Rules may be associated with distribution percentages, scores, or weights 126, which may be in any type and form and extend through any range. In some implementations, distribution percentages may be from 0 to 100% as shown, while in other implementations, scores may be from 0 to 1, 0 to 10, 1 to 100, −10 to 10, or any other such range. As discussed above, in some implementations, mandatory flags 124 may not be used; instead, a distribution percentage or score may be set to a maximum (e.g. 100%). In still other implementations, scores 126 may be unbounded, but may represent a priority for inclusion of rules. For example, higher priority numbers may be selected first for inclusion in a rule set until a threshold storage level is reached. In a further implementation, rules may be ordered by identifiers 120 in order of priority.

In some implementations, device identifiers of appliances receiving a rule may be added to a set of device identifiers 128 in database 105. This may allow for easy extraction and regeneration of a rule set for any particular appliance, for example, upon a factory or hard reset that clears an existing ruleset from memory. Storing device identifiers 128 with corresponding rules may also be useful for log analysis or research after an attack or attempt.

Figure 2A:
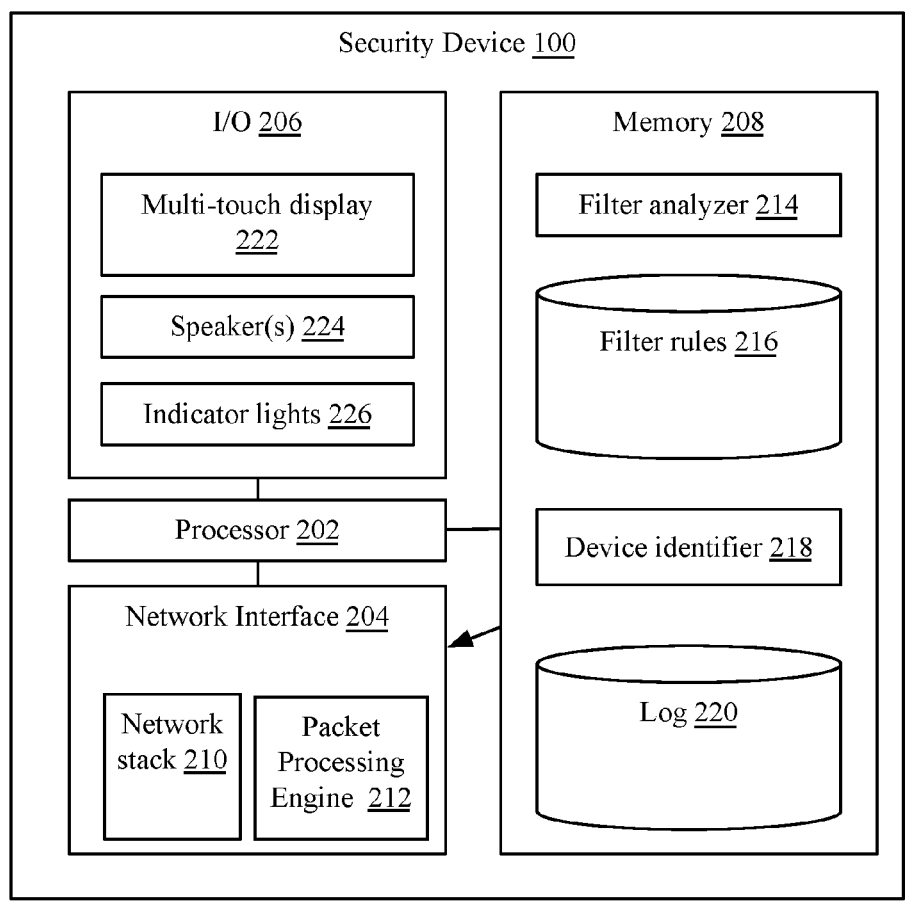
FIG. 2A is a block diagram of an embodiment of a security device.

FIG. 2A is a block diagram of an embodiment of a security device 100. Security device 100 may comprise a laptop computer, desktop computer, wearable computer, portable computer, smart phone, tablet computer, network camera, or any other type and form of computing device capable of encoding and streaming media. In some implementations, a security device 100 may not include all of elements 202-226 illustrated, or may include a plurality of any of elements 202-226 or other elements. For example, in one implementation, a security device 100 may comprise a plurality of network interfaces 204. Furthermore, although illustrated as a single device, in many implementations as discussed above, a security device 100 may comprise a plurality of security device 100 in communication via a network, such as a separate switch and firewall, or any other combination of these or other devices. In some implementations, a security device 100 may comprise a virtual device or virtual machine, executed by a physical machine.

A security device 100 may include one or more processors 202. A processor 202 may comprise a central processing unit (CPU), microprocessor, application-specific instruction-set (ASIC) processor, or any other type and form of processor for receiving, analyzing, filtering, blocking, modifying, and/or retransmitting packets. A processor 202 may communicate with one or more network interfaces 204, which may comprise any type and form of network interfaces, such as a physical interface (e.g. Ethernet, fiber optic interface, or any other such interface), a wireless interface (e.g. 802.11a, 802.11b, 802.11.g, 802.11n, 802.11ac, Bluetooth, cellular, or any other such interface), or a virtual or abstract interface (e.g. physical transport of storage, or "SneakerNet"), or any other such type and form of interface. Network interfaces 204 may be used for receiving and transmitting packets, as well as performing many types of data extraction and processing on the packets. Network interfaces 204 may communicate with computing devices 102, 104 via a network (not illustrated), which may comprise any type and form of network or networks, including a LAN and/or WAN such as the Internet. For example, in many implementations, a security device 100 may connect to a first LAN, which may connect to the Internet, which may further connect to a second LAN connected to client devices. Accordingly, a network may comprise one or more of a physical network, an Ethernet network, a satellite network, a wireless network, a cellular network, or any other network or combination of networks, and may further comprise one or more devices including gateways, firewalls, network accelerators, proxies, switches, hubs, routers, WiFi access points, load balancers, or any other such devices.

A network interface may include a network stack 210, which may comprise processing and functionality for a plurality of layers of the stack, including a physical layer, network layer, transport layer, session layer, presentation layer, application layer, or any other such layers. The network stack 210 may comprise routines for encapsulating and de-encapsulating headers and payloads of packets at various layers, and may provide functionality for one or more protocols at any layer of the network stack.

A security device 100 may execute a packet processing engine 212, which may be part of the network interface 204 or network stack 210, or may be executed separately by a processor 202. A packet processing engine 212 may comprise an application, service, server, daemon, routine, or other executable logic for processing packets, including performing network address translation, encryption, decryption, compression, decompression, modification of headers or payloads, buffering, caching, pooling, multiplexing, fragmentation or defragmentation, error correction, retransmission handling such as for a lossless protocol, or any other type and form of processing. In some implementations, packet processing engine 212 may extract data or identifiers from a packet for analysis and filtering, such as extracting IP addresses or ports, protocol types, QoS parameters, payload sizes, sequence numbers, or any other type and form of information.

A security device 100 may comprise one or more input/output interfaces 206. An input or output interface 206 may comprise any type and form of interface and/or connected peripherals, such as a video interface and display; a parallel or serial interface, such as a universal serial bus (USB) interface and a mouse or keyboard, or an external serial AT attachment (eSATA) interface and one or more external storage devices; or any other type and form of interface. In some implementations, an input/output interface 206 may include a multi-touch display 222, such as a capacitive multi-touch display, a resistive multi-touch display, a magnetic multi-touch display, or an optical multi-touch display. In some implementations, an input/output interface 206 may include a haptic display, such as a multi-touch display providing haptic feedback via one or more motors or vibrators. In some implementations, an input/output interface 206 may include one or more speakers 224, buzzers, or other audible signaling devices, to provide audible warnings (e.g. beeps, tones, sirens, or other such notifications or alerts). In some implementations, an input/output interface 206 may include one or more indicator lights 226, such as LED lights, back-lit LCD screens or relegendable buttons or indicators, etc. In some implementations, an input/output interface 206 may include a non-multi touch display (not illustrated), such as a single-touch capacitive or resistive display, for reduced expense. Such displays, including multi-touch display 222, may be used by a user or administrator to interact with an interface to provide command and control instructions, modify or apply filters, or otherwise perform configuration or maintenance tasks. For example, as discussed above, in some implementations in which remote administration is not available (e.g. due to a denial of service attack preventing remote connection establishment, or if the security device is configured in a high-security mode in which no network-based administrative access is allowed), the display 222 may be the only method of interacting with the appliance settings.

A security device 100 may comprise one or more memory devices 208. Memory 208 may comprise any type and form of memory or storage, including random access memory (RAM), hard drive storage, solid state drive storage, flash memory, optical or magneto-optical storage, tape storage, or any other type and form of storage device.

Security device 100 may execute a filter analyzer 214, which may be stored in memory 208 and executed by a processor 202 and/or network interface 204. Filter analyzer 214 may comprise an application, service, server, daemon, routine, or other executable logic for performing queries of a database of filter rules 216, via an R-tree or R*-tree index, as discussed above, such as generating and executing SQL queries or queries in a similar database language. As discussed above, in some implementations, a relational database 216 may comprise one or more parameters and associated processing rules, such as source IP address ranges and corresponding blocking rules. Parameters may be any type and form of information extracted from packets as discussed above, and/or may include meta-information about a packet or connection, such as a connection latency, error rate, jitter, bandwidth, or other such information. For example, a filter rule may be configured to block packets to a specified destination IP address if a connection to the destination has a latency within a predetermined range. Processing rules define actions to be performed on matching packets, including blocking or discarding the packet, buffering or delaying the packet, forwarding the packet to a specified destination, transmitting the packet to its identified destination address, and/or modifying one or more headers or payloads of the packet.

Rules 216 may be periodically refreshed. For example, in many implementations, a security device 100 may maintain a timer. Upon expiration of the timer (e.g. once per day, once per week, once per two weeks, once per 12 hours, or any other time period), the security device 100 may transmit a request for a refreshed rule set 216 to a management server. The management server may respond with a replacement rule set including mandatory rules and randomly selected (according to distribution weights or scores) potential rules, as discussed above. In some implementations, to reduce bandwidth, the server may respond with an identification of rules to be removed or replaced from a current rule set. For example, the management server may identify a current rule set for the security device (e.g. via a device identifier of the device stored in association with rules in a database as discussed above, via a stored copy of the rule set, etc.), and may generate a new rule set for the device, including randomly selecting potential rules as discussed above. The management server may identify a delta or difference between the two rule sets, and may transmit an identification of the difference to the security device (e.g. "delete rule #105; add new rule #202: [actions, conditions, and parameters]; etc."). As mandatory rules may be only rarely removed or added, this may significantly reduce bandwidth requirements, and may help scaling rule distribution to large numbers of security devices.

In many implementations, a request for new rules or other communications with the management server may comprise a device identifier 218. Device identifier 218 may comprise an alphanumeric string, serial number, MAC address, username or account name, address, GUID, or any other type and form of identifier to distinguish the security device from other security devices. In many implementations, device identifier 218 may be set by a manufacturer, while in other implementations, device identifier 218 may be set by an administrator or user (e.g. user name).

Figure 2B:
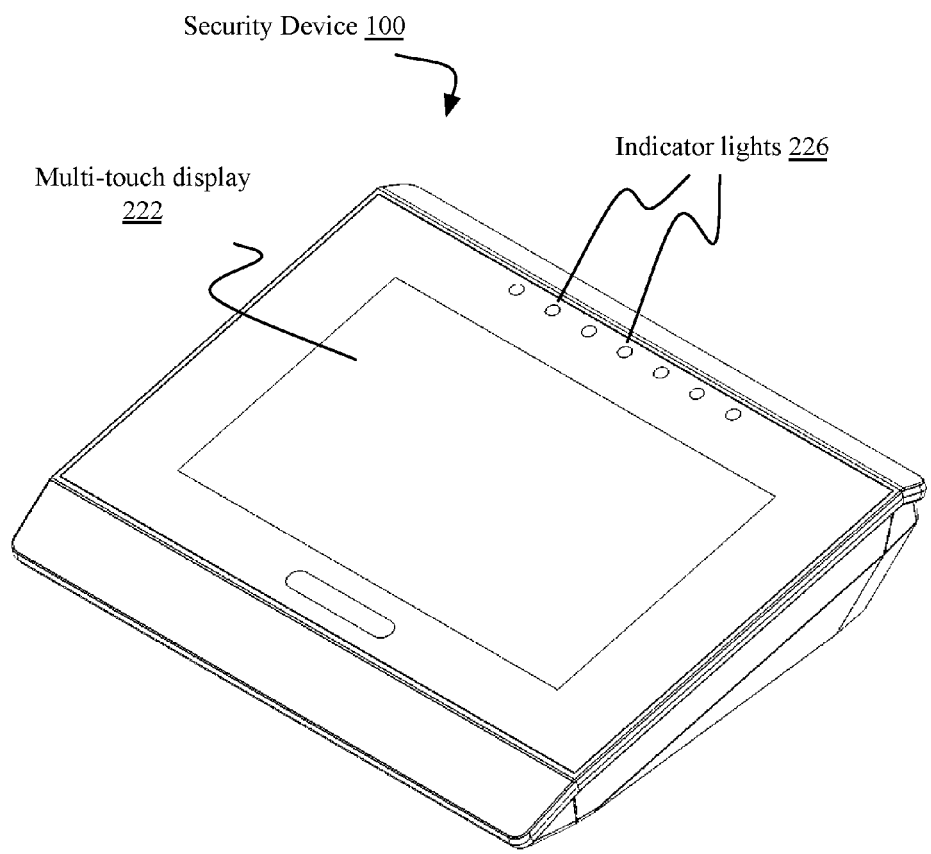
FIG. 2B is a perspective illustration of an embodiment of a security device.

In some implementations, a security device 100 may maintain a log 220. Log 220 may comprise a database, flat file, or other type and form of data structure for recording packet parameters and applied filter actions. In some implementations, security device 100 may record actions with timestamps, device identifiers, or other distinguishing information. FIG. 2B is a perspective illustration of an implementation of a security device 100.

As shown, the security device may include a multi-touch display 222 and one or more indicator lights 226. Indicator lights 226 may comprise lights indicating various functions or connectivity. For example, in one such implementation, a first indicator light 226 may be lit to show that the device is on and operating. In some implementations, such an indicator light may flash to indicate a boot up sequence is executing, or that a firmware upgrade has been downloaded and is ready for installation at a next reboot, or any other such function. Indicator lights 226 may exist to show status of other functions, including network connectivity to an external network (e.g. the Internet); that an IP address has been obtained from a modem (e.g. via a dynamic configuration host protocol (DHCP)); that a WiFi access point is operating; or any other such functions.

Multi-touch display 222 may provide a user interface with an identification of statuses of various functions or components of the security device 100, such as a WiFi access point, switch, firewall, network address translator, virus scanner, encryption or decryption module, or any other such function or component; and/or interfaces for configuration and control of such functions or components. For example, a multi-touch display 222 may provide an interface to enable a user to set, modify, and/or enable or disable a packet filtering rule.

In one such implementation, for example, a security device 100 may be installed between a local area network (e.g. in a household) and an external network (e.g. the Internet). A user may install a new device on the local area network, such as a "smart" appliance or Internet-of-Things (IoT) device such as a smart thermostat, lighting controller, smart refrigerator, or any other such device. The new device may connect to the local network (e.g. via a WiFi connection) and may begin transmitting network packets (e.g. containing status information or requests for commands or other such data). The security device 100 may detect the new packets as being transmitted from an unknown device and may buffer the packets or block transmission of the packets to other devices on the local network and/or to servers or devices via the external network. The security device 100 may display, via the user interface of the multi-touch display 222, a status or information about the received packets and controls to forward the packets during the present session or for a limited time; to block or discard the packets; to add the device as a trusted device on the network and allow forwarding packets in the future; or any other such function. For example, a user may use the user interface to identify the device with a label or similar identifier (e.g. "living room thermostat"); add and apply filter rules to the device (e.g. allow "living room thermostat" to send HTTP requests to and from "user's smart phone" via the local network that are less than 1K in size and match a predetermined pattern, no more than once per second; block all other outbound packets); or any other such rules.

Figure 2C:
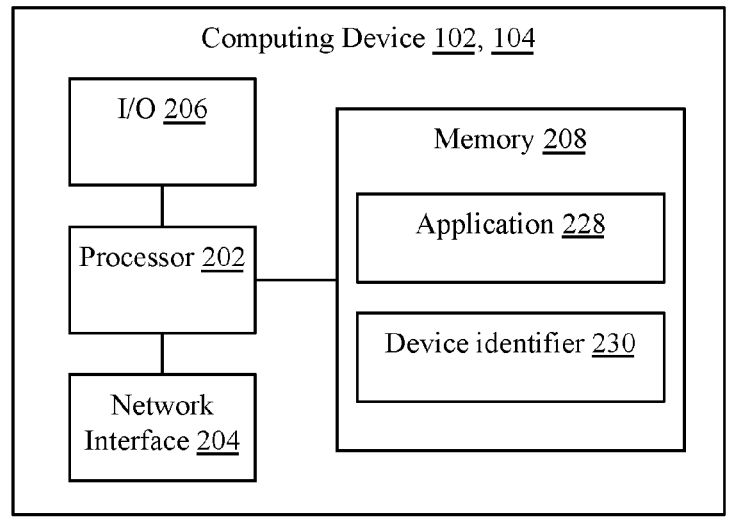
FIGS. 2C and 2D are block diagrams of embodiments of a client device and a management server, respectively.

FIG. 2C is a block diagram of an implementation of a computing device 102, 104. As discussed above, computing devices 102, 104 may comprise a laptop computer, desktop computer, tablet computer, wearable computer, smartphone, smart television, set-top box, video game console, or any other type and form of computing device. As with security device 100, the computing devices 102, 104 may comprise one or more processors 202, network interfaces 204, input/output interfaces 206, and memory devices 208. In some implementations, computing device 102, 104 may execute one or more applications 228 for communicating with other computing devices via a network, such as a server, web browser, network application, or other such executable logic. In some implementations, computing devices 102, 104 may be identified by a device identifier 230, which may comprise a media access control (MAC) address, IP address, serial number, globally unique identifier (GUID), device name, user name, account number, or any other type and form of information. Device identifiers 230 may be used as parameters for filtering packets, in some implementations.

Figure 2D:
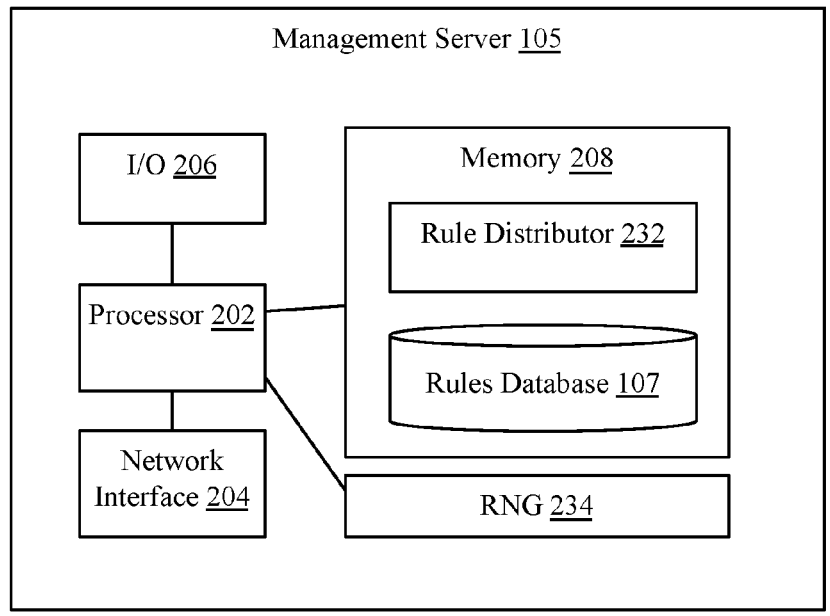

FIG. 2D is a block diagram of an implementation of a management server 105. A management server 105 may comprise a laptop computer, desktop computer, rackmount computer, blade computer, workstation, or any other type and form of computing device. In some implementations, management server 105 may comprise a physical machine, or a virtual machine executed by a physical machine. In many implementations, one or more components of a management server 105 may be distributed across a cloud or cluster of machines, such as a server cloud or server farm. Accordingly, management server 105 may comprise one or more physical machines, one or more virtual machines executed by one or more physical machines, or a combination of virtual and physical machines. As with security device 100, the management server 105 may comprise one or more processors 202, network interfaces 204, input/output interfaces 206, and memory devices 208.

In some implementations, a management server 105 may comprise or execute a rule distributor 232. Rule distributor 232 may comprise an application, server, service, routine, daemon, or other executable logic for generating and distributing rule sets for security devices. As discussed above, management server 105 may maintain a rule database 107, and rule distributor 232 may select mandatory and potential rules from rules database 107 to generate rule sets for security devices. Rule sets may be cached or stored in memory 208 in some implementations to allow easy rebuilding or retransmission or computation of deltas with new rule sets, as discussed above.

In many implementations, a management server 105 may comprise a random or pseudorandom number generator (RNG) 234 for randomly selecting from rules to be added to a rule set for a security device. RNG 234 may comprise hardware, software, or a combination of hardware and software. In many implementations, a truly random number generator 234 may be used to increase security for the system by preventing discovery of distribution patterns of rules. RNG 234 may comprise a physical noise source, such as an optical, acoustic, magnetic, mechanical, or temperature sensor, or any other type of random source. In other implementations, management server 105 may select rules based off a device identifier of a security device. For example, rather than using a random number generator 234, in one implementation, a rule distributor 232 may generate random numbers by calculating a hash result with inputs of one or more of a device identifier, a request timestamp, a synchronization value of a connection to the device, a round trip time of communications to the device, or any combination of these or other values. This may provide sufficient entropy without requiring additional hardware.

Figure 3A:
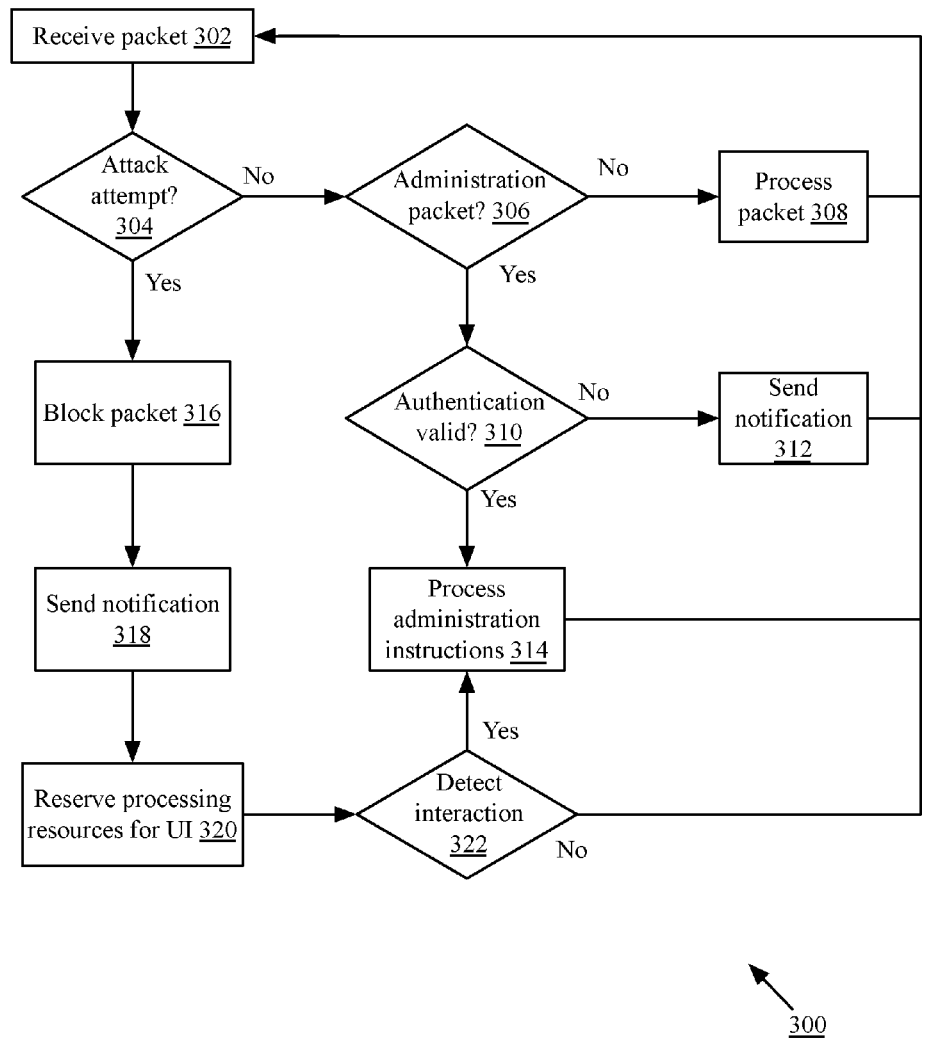
FIGS. 3A-3B are flow charts of embodiments of methods for controlling a security device via a local input interface.

FIG. 3A is a flow chart of an implementation of a method 300 for controlling a security device via a local input interface, such as a multi-touch screen. At step 302, a packet may be received by the security device. The packet may be received via a local network interface (e.g. to a LAN, including a WiFi interface to a wireless LAN) or via an external network interface (e.g. to a WAN, such as the Internet).

At step 304, the security device may determine if the packet is part of an attack attempt or represents an attack attempt. In some implementations, packets may be identified as an attack attempt based on a rate of reception exceeding a predetermined threshold, indicating a potential denial of service or distributed denial of service attack. In other implementations, packets may be identified as an attack attempt based on a port or protocol of the packet and a destination address. For example, a security device may have a rule indicating that a computing device should not receive any inbound SSH packets, and may identify such packets as intrusion attempts. Accordingly, the security device may determine if a packet is part of an attack or represents an attack attempt based on matching to one or more rules in a rules database, based on any information about the packet, including source, destination, protocol, type, QoS requirement, metadata, payload contents, payload size, frequency of reception, or any other such data.

If the packet is not part of an attack or representing an attack attempt, then at step 306, the security device may determine if the packet is an administration packet or request (e.g. an HTTP request to a web server maintained by the security device). If not, then at step 308, the packet may be processed according to one or more forwarding, blocking, or modification rules in a rules database, as discussed above. If the packet is an administration packet or request, then at step 310, in some implementations, the security device may determine if the packet is associated with a valid authorization token or cookie. During a first connection, the security device may authenticate a computing device of an administrator or user via any sort of authentication system, such as a user name and password login screen; by retrieving information about the computing device, such as a GUID or other information; or any other such method. The security device may generate or provide a cookie to the device for further requests during the authenticated session. If the authentication is missing, invalid, or the session has expired (e.g. according to a predetermined timer duration, or any other such means), then at step 312 in some implementations, the security device may transmit a notification to a computing device of an administrator on the local or external network (e.g. a smart phone, a desktop computer, a management service, etc.); may record a notification in a log of the security device; may output a visible and/or audible alert via an output device of the security device, such as a speaker, indicator light, or display screen; or any combination of these or other notifications.

If the authentication is valid, then at step 314, the security device may process the administration request or configuration instructions, such as by enabling or disabling a rule in a rules database; modifying a rule; retrieving and/or updating firmware; providing a log of errors, notifications, or other data; enabling or disabling an interface (e.g. WiFi, Bluetooth, Ethernet, etc.); adding or removing a device from a local network (e.g. an IoT device or personal device of a user; a network device; a security device; or any other such devices); or any other type and form of instruction.

If the packet is determined to be part of an attack attempt or represents an attack, then at step 316, the packet may be blocked. Blocking the packet may comprise buffering the packet, discarding the packet, logging the packet, forwarding the packet to another device for quarantine and/or inspection (e.g. an analyzer device, a maintenance server, a sandboxed or quarantined virtual machine, etc.). In some implementations, the packet may be modified and forwarded, such as by replacing a payload of the packet with a predetermined payload (e.g. null data). The various actions to perform may be specified in an entry in the rules database of the security device, as discussed above.

At step 318, the security device may send a notification. As discussed above in connection with step 312, sending a notification may comprise transmitting a notification to a computing device of an administrator on the local or external network (e.g. a smart phone, a desktop computer, a management service, etc.); recording a notification in a log of the security device; outputting a visible and/or audible alert via an output device of the security device, such as a speaker, indicator light, or display screen; or any combination of these or other notifications.

At step 320, in some implementations, the security device may reserve a predetermined portion of resources for a local user interface. For example, in some implementations, the security device may reserve a portion of memory for exclusive use by the user interface, or may throttle or cease execution of processing threads to free a predetermined amount of processing cycles or operations per second. For example, the security device may reserve memory and slow down packet processing operations in order to provide the user interface. The interface may be designed a high priority thread or operation, and instructions from the interface may be processed in a priority queue or at a faster rate than for other operations. The user interface may be displayed on a display of the security device, such as via a multi-touch screen. In some implementations, the security device may even pause processing of network packets to or from an external network (e.g. the Internet), from an internal network (e.g. a LAN), or both, until a user or administrator has verified or modified a filter configuration. For example, upon detecting a denial of service attack, the security device may block all incoming packets from the WAN while still processing packets on the LAN (and, in some implementations, still transmitting outbound packets to the WAN). This may allow network devices within the local environment to continue communicating with each other during the attack, without consuming all processing resources trying to handle incoming packets.

The security device may detect interactions with the local user interface, such as interactions with the multi-touch screen, at step 322. If no interactions occur within a predetermined time limit, then in some implementations, buffered packets at step 316 may be discarded, log entries recorded, and normal processing may resume at step 302. Memory and processor time reserved for the user interface may be released, in some implementations. If interactions are detected, then at step 314, corresponding management instructions may be processed, as discussed above.

Accordingly, a user or administrator may operate a local user interface of the security device, at a high processing priority, even during a DoS attack or packet storm that would make connecting via another computing device difficult or impossible. The user or administrator may take steps to mitigate any attack, such as creating a specific filter to match the attack parameters (e.g. payload type, contents, size, etc.; destination IP address and/or port; source address or addresses; etc.) and applying a blocking rule; or moving a filtering rule up in priority within a rule set so that it is processed and applied earlier. For example, during an active attack, a corresponding filter may be moved up to a first index within the rule set, such that it is applied first to incoming packets, potentially blocking or discarding the packets without having to search through or apply other rule sets. This may significantly speed up response time and reduce processor and memory consumption in dealing with the attack, while still processing normal traffic.

Figure 3B:
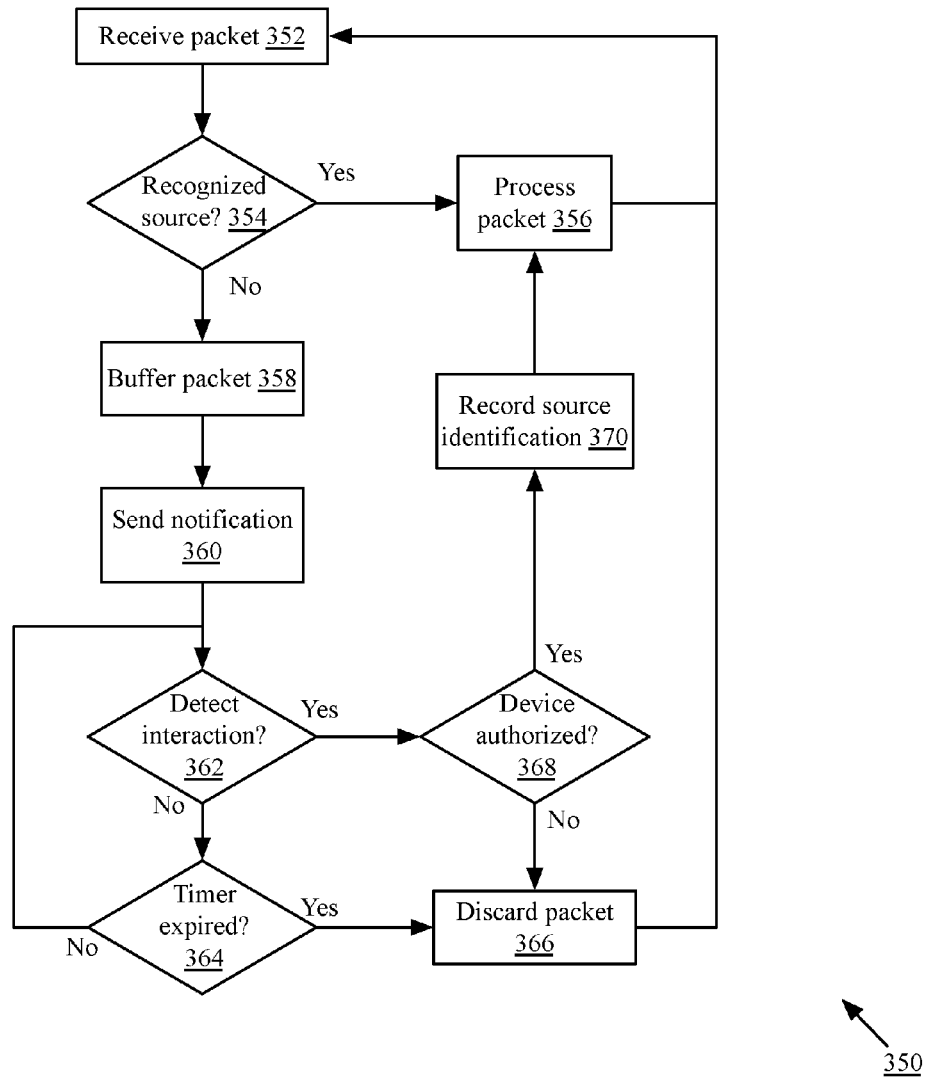

FIG. 3B is a flow chart of an implementation of another method 350 for controlling a security device via a local input interface, such as a multi-touch screen. As discussed above, in some implementations, when a new device is added to the network, the security device may automatically recognize the new device (e.g. via a DHCP request and configuration; via neighbor discovery protocols; via an identification and handshaking protocol, such as Bonjour, manufactured by Apple, Inc. of Cupertino, Calif., or the Discovery and Launch (DIAL) protocol; by receiving or intercepting packets provided by the new device; or any other such method). In some implementations, it may be desirable to prevent or block requests to configure or process security rules for the new device via the network, as they may represent vectors for attack. For example, if a corrupt IoT device with pre-installed malware is attached to the network, it may seek to communicate with the security device to modify or disable filter rules. If the security device allows such incoming configuration requests, other attacks may proceed successfully or filtering of communications between the IoT device and remote command and control or data servers may be prevented. Accordingly, in some implementations, communications to and from the device may be blocked or buffered until a user or administrator authorizes the device via a user interface of the security device. By requiring physical proximity and input, many potential attack vectors may be obviated.

At step 352, in some implementations, the security device may receive a packet via a local network interface (e.g. Ethernet, WiFi, Bluetooth, or any other such interface). At step 354, the security device may determine if the packet came from a recognized source, such as a previously authorized (or unauthorized, but recognized) device. The security device may recognize the packet based on a data layer address such as a MAC address; network layer address such as an IP address; explicit device identifiers included in the communication such as a GUID, cookie, user name, or other such information; an expected sequence or acknowledgement number; or any combination of this or other information.

If the source is recognized, then at step 356, the packet may be processed normally. Processing the packet may comprise applying one or more blocking, forwarding, or modification rules to the packet or payload of the packet, as discussed above.

If the source is not recognized, then in some implementations, at step 358, the packet may be buffered. The packet may be stored temporarily such that, if the device is subsequently authorized, the packet may be retrieved from the buffer and processed and/or forwarded. In other implementations, the packet may be discarded to save memory, instead relying on the unrecognized device to retransmit the packet.

At step 360, the security device may send a notification. As discussed above, sending a notification may comprise sending a notification may comprise transmitting a notification to a computing device of an administrator on the local or external network (e.g. a smart phone, a desktop computer, a management service, etc.); recording a notification in a log of the security device; outputting a visible and/or audible alert via an output device of the security device, such as a speaker, indicator light, or display screen; or any combination of these or other notifications.

At step 362, the security device may determine whether it has detected an interaction with a user interface provided by an input/output device of the security device, such as a multi-touch display. If not, then in some implementations, the security device may determine whether a response timer has expired at step 364. The response timer may be set to a predetermined duration, such as 30 seconds, 1 minute, 5 minutes, or any other such duration, and may be set at or between any of steps 354 and 362.

If the timer has expired without an interaction being detected, then the user or administrator may not be available. This may be odd if the user or administrator has just installed the new device, as they would likely be in proximity to the security device. Thus, in some instances, the user or administrator may not realize that a device has become active or joined the network. For example, the user or administrator may be using a device and not realize that it has network capabilities or not wish to activate them at that time, such as a sous vide circulator with both manual controls and wireless network capability to interact with a smart phone, a smart refrigerator or air conditioner, or any other such device. If the device's network functionality is enabled (such as by default), the device may try to connect to the network without explicit command from a user. Devices attached to a network without the knowledge of a user or administrator are rarely updated or properly secured, and accordingly, such devices may represent potential vectors for attack. Accordingly, if the timer has expired at step 364, then at step 366, the packet may be discarded. In some implementations, a notification may be recorded in a log of the security device, a notification may be sent to a management service or server or computing device of a user or administrator, or other steps taken.

If an interaction is detected at step 362, the interaction may be to confirm that the new device is authorized or unauthorized. In some implementations, the user interface may allow the user or administrator to block communications to or from the device, forward communications to or from the device normally, modify communications to or from the device, or perform other functions. For example, a user or administrator may inspect the received packet data via the user interface, such as source and destination addresses, protocol types, payload contents, etc. The user or administrator may then select a corresponding action for the packet, and/or generate or modify filters or rules in the rule set of the security device. If the user or administrator indicates to discard or block the packet or that the device is not authorized, then at step 366, the packet may be discarded. If the user or administrator indicates to apply one or more rules to the packet, forward the packet, and/or modify the packet, then at step 370, the security device may record the identification of the source as recognized, and at step 356, may apply the rules or filters and process the packet accordingly.

Thus, in some such implementations, by requiring physical proximity and interaction with the security device via an incorporated input/output device, such as a multi-touch screen, the security device may automatically recognize and quarantine communications from new devices on the network until authorized by a user or administrator. This provides additional security, while avoiding false or spurious device authorizations via the network, either unintentionally or by malicious actors or compromised devices.

Accordingly, the systems and methods discussed herein provide systems and methods for directly interacting with and controlling a network security appliance. In one aspect, the present disclosure is directed to an appliance, comprising a housing; a network security device deployed within the housing, coupled to a first network and a second network; and an input/output device deployed on a surface of the housing, the input/output device providing a user interface of the network security device.

In some implementations, the network security device is configured, responsive to receipt of a network packet from an unrecognized device, to store the network packet in a memory of the network security device; and the input/output device is configured to display, via the user interface, a notification of the received network packet. In a further implementation, the input/output device is configured to detect an interaction with the user interface indicating to authorize the unrecognized device. In a still further implementation, the network security device is configured, responsive to detection of the interaction, to retrieve the network packet from the memory of the network security device, and forward the network packet to a destination identified in the network packet. In another further implementation, the network security device is configured, responsive to an absence of a detection of an interaction with the user interface, to discard the network packet.

In some implementations, the input/output device is a multi-touch screen display. In some implementations, the appliance includes a first network interface coupled to the first network and a second network interface coupled to the second network. In some implementations, the network security device is configured to, responsive to receipt of a network packet matching a predetermined filter: block transmission of the network packet, and reserve a predetermined amount of memory of the network security device for the user interface provided by the input/output device. In a further implementation, the network security device is further configured to increase a priority of execution of the user interface, responsive to receipt of the network packet matching the predetermined filter. In another further implementation, the network security device is further configured to decrease a priority of execution of one or more packet processing threads, responsive to receipt of the network packet matching the predetermined filter. In still another further implementation, the network security device is further configured to transmit a notification to a second device, responsive to receipt of the network packet matching the predetermined filter. In some implementations, the network security device is further configured to: detect an interaction with the user interface indicating to increase a priority of a second filter matching the network packet, and increase the priority of the second filter in a rule set of the network security device. In a further implementation, the network security device is further configured to apply the second filter ahead of one or more lower-priority filters to a second received network packet; and discard the second received network packet prior to applying the one or more lower-priority filters, responsive to the second received network packet matching the second filter. In some further implementations, the predetermined filter comprises one or more of a source address, destination address, protocol, payload size, or frequency of packet reception. In some implementations, the appliance includes a processor; a memory device; and a network interface.

In another aspect, the present disclosure is directed to a method that includes receiving, by a network security device deployed within a housing of an appliance, a first packet; and displaying a notification of receipt of the first packet, by an input/output device deployed on a surface of the housing, the input/output device providing a user interface of the network security device, responsive to the first packet matching a predetermined filter.

In some implementations, the method includes storing the first packet in a memory of the appliance, by the network security device, responsive to the first packet matching a predetermined filter. In a further implementation, the method includes reserving a predetermined amount of memory of the network security device for the user interface provided by the input/output device, responsive to the first packet matching a predetermined filter.

In some implementations, the method includes detecting an interaction with the user interface indicating a source of the first packet is an authorized device. In a further implementation, the method includes retrieving the first packet from the memory of the appliance, and forwarding the first packet to a destination identified in the first packet, responsive to the detected interaction with the user interface.

Figure 4:
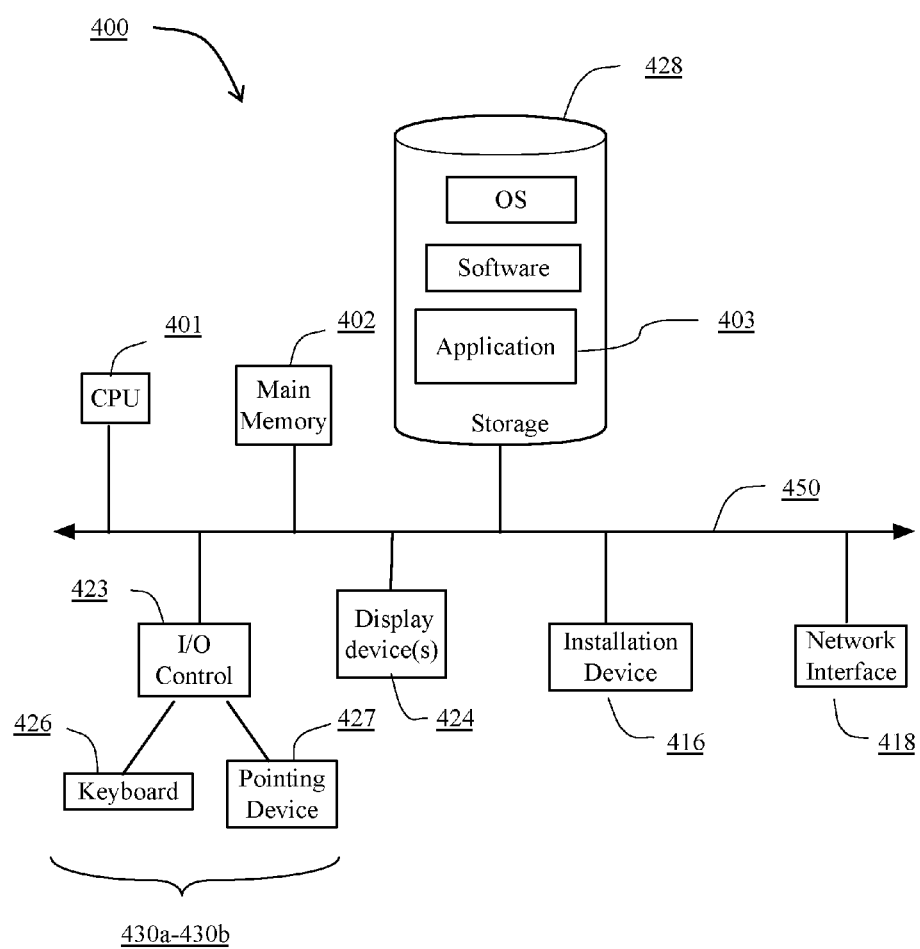
FIG. 4 is a block diagram of an exemplary computing device useful for practicing the methods and systems described herein.

FIG. 4 is a block diagram of an exemplary computing device useful for practicing the methods and systems described herein. The various devices 100, 102, 104, 105 may be deployed as and/or executed on any type and form of computing device, such as a computer, network device or appliance capable of communicating on any type and form of network and performing the operations described herein. The computing device may comprise a laptop computer, desktop computer, virtual machine executed by a physical computer, tablet computer, such as an iPad tablet manufactured by Apple Inc. or Android-based tablet such as those manufactured by Samsung, Inc. or Motorola, Inc., smart phone or PDA such as an iPhone-brand/iOS-based smart phone manufactured by Apple Inc., Android-based smart phone such as a Samsung Galaxy or HTC Droid smart phone, or any other type and form of computing device. FIG. 4 depicts a block diagram of a computing device 400 useful for practicing an embodiment of the media sources, streaming servers, controllers, and/or client devices discussed above. A computing device 400 may include a central processing unit 401; a main memory unit 402; a visual display device 424; one or more input/output devices 430a-430b (generally referred to using reference numeral 430), such as a keyboard 426, which may be a virtual keyboard or a physical keyboard, and/or a pointing device 427, such as a mouse, touchpad, or capacitive or resistive single- or multi-touch input device; and a cache memory 440 in communication with the central processing unit 401.

The central processing unit 401 is any logic circuitry that responds to and processes instructions fetched from the main memory unit 402 and/or storage 428. The central processing unit may be provided by a microprocessor unit, such as: those manufactured by Intel Corporation of Santa Clara, Calif.; those manufactured by Motorola Corporation of Schaumburg, Ill.; those manufactured by Apple Inc. of Cupertino Calif., or any other single- or multi-core processor, or any other processor capable of operating as described herein, or a combination of two or more single- or multi-core processors. Main memory unit 402 may be one or more memory chips capable of storing data and allowing any storage location to be directly accessed by the microprocessor 401, such as random access memory (RAM) of any type. In some embodiments, main memory unit 402 may include cache memory or other types of memory.

The computing device 400 may support any suitable installation device 416, such as a floppy disk drive, a CD-ROM drive, a CD-R/RW drive, a DVD-ROM drive, tape drives of various formats, USB/Flash devices, a hard-drive or any other device suitable for installing software and programs such as any client agent, host agent, server, application 403, or portion thereof. The computing device 400 may further comprise a storage device 428, such as one or more hard disk drives or redundant arrays of independent disks, for storing an operating system and other related software, and for storing application software programs.

Furthermore, the computing device 400 may include a network interface 418 to interface to a Local Area Network (LAN), Wide Area Network (WAN) or the Internet through a variety of connections including, but not limited to, standard telephone lines, LAN or WAN links (e.g., Ethernet, T1, T3, 56 kb, X.25), broadband connections (e.g., ISDN, Frame Relay, ATM), wireless connections, (802.11a/b/g/n/ac, BlueTooth), cellular connections, or some combination of any or all of the above. The network interface 418 may comprise a built-in network adapter, network interface card, PCMCIA network card, card bus network adapter, wireless network adapter, USB network adapter, cellular modem or any other device suitable for interfacing the computing device 400 to any type of network capable of communication and performing the operations described herein.

A wide variety of I/O devices 430a-430n may be present in the computing device 400. Input devices include keyboards, mice, trackpads, trackballs, microphones, drawing tablets, and single- or multi-touch screens. Output devices include video displays, speakers, headphones, inkjet printers, laser printers, and dye-sublimation printers. The I/O devices 430 may be controlled by an I/O controller 423 as shown in FIG. 4. The I/O controller may control one or more I/O devices such as a keyboard 426 and a pointing device 427, e.g., a mouse, optical pen, or multi-touch screen. Furthermore, an I/O device may also provide storage 428 and/or an installation medium 416 for the computing device 400. The computing device 400 may provide USB connections to receive handheld USB storage devices such as the USB Flash Drive line of devices manufactured by Twintech Industry, Inc. of Los Alamitos, Calif.

The computing device 400 may comprise or be connected to multiple display devices 424a-424n, which each may be of the same or different type and/or form. As such, any of the I/O devices 430a-430n and/or the I/O controller 423 may comprise any type and/or form of suitable hardware, software embodied on a tangible medium, or combination of hardware and software to support, enable or provide for the connection and use of multiple display devices 424a-424n by the computing device 400. For example, the computing device 400 may include any type and/or form of video adapter, video card, driver, and/or library to interface, communicate, connect or otherwise use the display devices 424a-424n. A video adapter may comprise multiple connectors to interface to multiple display devices 424a-424n. The computing device 400 may include multiple video adapters, with each video adapter connected to one or more of the display devices 424a-424n. Any portion of the operating system of the computing device 400 may be configured for using multiple displays 424a-424n. Additionally, one or more of the display devices 424a-424n may be provided by one or more other computing devices, such as computing devices 400a and 400b connected to the computing device 400, for example, via a network. These embodiments may include any type of software embodied on a tangible medium designed and constructed to use another computer's display device as a second display device 424a for the computing device 400. One ordinarily skilled in the art will recognize and appreciate the various ways and embodiments that a computing device 400 may be configured to have multiple display devices 424a-424n.

A computing device 400 of the sort depicted in FIG. 4 typically operates under the control of an operating system, such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein.

The computing device 400 may have different processors, operating systems, and input devices consistent with the device. For example, in one embodiment, the computer 400 is an Apple iPhone or Motorola Droid smart phone, or an Apple iPad or Samsung Galaxy Tab tablet computer, incorporating multi-input touch screens. Moreover, the computing device 400 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software embodied on a tangible medium, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable nonvolatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, JavaScript, or in any byte code language such as JAVA. The software programs may be stored on or in one or more articles of manufacture as object code.

What is claimed:

1. An appliance, comprising:
  a housing;
  a network security device deployed within the housing, coupled to a first network and a second network; and
  an input/output device deployed on a surface of the housing, the input/output device providing a user interface of the network security device;
  wherein the network security device is configured to, responsive to receipt of a network packet matching a predetermined filter:
  block transmission of the network packet, and
  decrease a priority of execution of one or more packet processing threads to reduce processor utilization of processing related to network packets matching the predetermined filter.

2. The appliance of claim 1, wherein the network security device is configured, responsive to receipt of a network packet from an unrecognized device, to store the network packet in a memory of the network security device; and wherein the input/output device is configured to display, via the user interface, a notification of the received network packet.

3. The appliance of claim 2, wherein the input/output device is configured to detect an interaction with the user interface indicating to authorize the unrecognized device.

4. The appliance of claim 3, wherein the network security device is configured, responsive to detection of the interaction, to retrieve the network packet from the memory of the network security device, and forward the network packet to a destination identified in the network packet.

5. The appliance of claim 2, wherein the network security device is configured, responsive to an absence of a detection of an interaction with the user interface, to discard the network packet.

6. The appliance of claim 1, wherein the input/output device is a multi-touch screen display.

7. The appliance of claim 1, further comprising a first network interface coupled to the first network and a second network interface coupled to the second network.

8. The appliance of claim 1, wherein the network security device is configured to, responsive to receipt of the network packet matching the predetermined filter:
reserve a predetermined amount of memory of the network security device for the user interface provided by the input/output device.

9. The appliance of claim 8, wherein the network security device is further configured to transmit a notification to a second device, responsive to receipt of the network packet matching the predetermined filter.

10. The appliance of claim 8, wherein the predetermined filter comprises one or more of a source address, destination address, protocol, payload size, or frequency of packet reception.

11. The appliance of claim 1, further comprising:
a processor;
a memory device; and
a network interface.

12. An appliance, comprising:
a housing;
a network security device deployed within the housing, coupled to a first network and a second network; and
an input/output device deployed on a surface of the housing, the input/output device providing a user interface of the network security device;
wherein the network security device is configured to increase a priority of execution of the user interface to increase responsiveness of the user interface, responsive to receipt of a network packet matching a predetermined filter.

13. An appliance, comprising:
a housing;
a network security device deployed within the housing, coupled to a first network and a second network; and
an input/output device deployed on a surface of the housing, the input/output device providing a user interface of the network security device;
wherein the network security device is configured to, responsive to receipt of a network packet matching a predetermined filter:
detect an interaction with the user interface indicating to increase a priority of a second filter matching the network packet, and
increase the priority of the second filter in a rule set of the network security device.

14. The appliance of claim 13, wherein the network security device is further configured to apply the second filter ahead of one or more lower-priority filters to a second received network packet; and discard the second received network packet prior to applying the one or more lower-priority filters, responsive to the second received network packet matching the second filter.

15. A method, comprising:
receiving, by a network security device deployed within a housing of an appliance, a first packet;
displaying a notification of receipt of the first packet, by an input/output device deployed on a surface of the housing, the input/output device providing a user interface of the network security device, responsive to the first packet matching a predetermined filter;
blocking transmission of the first packet, by the network security device, responsive to the first packet matching the predetermined filter;
storing the first packet in a memory of the appliance, by the network security device, responsive to the first packet matching the predetermined filter; and
decreasing a priority of execution of one or more packet processing threads to reduce processor utilization of processing related to network packets matching the predetermined filter.

16. The method of claim 15, further comprising reserving a predetermined amount of memory of the network security device for the user interface provided by the input/output device, responsive to the first packet matching a predetermined filter.

17. The method of claim 15, further comprising detecting an interaction with the user interface indicating a source of the first packet is an authorized device.

18. The method of claim 17, further comprising retrieving the first packet from the memory of the appliance, and forwarding the first packet to a destination identified in the first packet, responsive to the detected interaction with the user interface.

* * * * *